United States Patent [19]

Pinschmidt, Jr. et al.

[11] Patent Number: 5,194,492

[45] Date of Patent: Mar. 16, 1993

[54] TWO-PHASE PROCESS FOR PREPARING POLY(VINYL ALCOHOL)-CO-POLY(VINYLAMINE)

[75] Inventors: Robert K. Pinschmidt, Jr.; Ta-Wang Lai, both of Allentown, Pa.

[73] Assignee: Air Products and Chemicals, Inc., Allentown, Pa.

[21] Appl. No.: 816,196

[22] Filed: Jan. 2, 1992

Related U.S. Application Data

[62] Division of Ser. No. 181,887, Apr. 15, 1988.

[51] Int. Cl.$^5$ .............................................. C08F 8/00
[52] U.S. Cl. ....................................... 525/60; 525/61; 525/328.2; 526/307.4
[58] Field of Search ..................... 525/60, 61, 328.2; 526/307.4

[56] References Cited

U.S. PATENT DOCUMENTS

| | | | |
|---|---|---|---|
| 4,393,174 | 7/1983 | Dawson et al. | 525/369 |
| 4,421,602 | 12/1983 | Brunnmueller et al. | 525/328.2 |
| 4,490,557 | 12/1984 | Dawson et al. | 526/75 X |
| 4,772,359 | 9/1988 | Liphart et al. | 162/163 |
| 4,774,285 | 9/1988 | Pfohl et al. | 525/60 |

OTHER PUBLICATIONS

R. W. Stackman et al., Ind. Engr. Chem Prod.Res. Dev. 1985, 24, 242.

R. H. Summerville, et al., Polymer Reprints 24, 12 (1983).

W. M. Brower et al., J. Polym. Sci Polym Chem Ed, 1984, 22, 2359.

*Primary Examiner*—Joseph L. Schofer
*Assistant Examiner*—Jim Reddick
*Attorney, Agent, or Firm*—Michael Leach; William F. Marsh; James C. Simmons

[57] ABSTRACT

Vinyl acetate and an N-vinyl formamide are copolymerized to yield poly(vinyl acetate)-co-poly(N-vinyl formamide) which is base hydrolyzed to poly(vinyl alcohol)-co-poly(N-vinyl formamide). Two phase hydrolysis of particles of poly(vinyl alcohol)-co-poly(N-vinyl formamide) as a slurry in methanol yields particles of poly(vinyl alcohol)-co-poly(vinylamine).

Provided is a copolymer of the following general formula

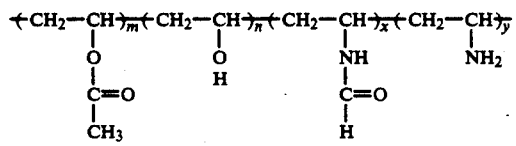

where
m is 0 to 15 mole %,
n is 50 to 99 mole %, x is 0 to 30 mole %, and y is 1 to 50 mole %.

9 Claims, No Drawings

TWO-PHASE PROCESS FOR PREPARING POLY(VINYL ALCOHOL)-CO-POLY(VINYLAMINE)

This is a division of application Ser. No. 07/181,887 filed Apr. 15, 1988.

TECHNICAL FIELD

The invention relates to amine functional polymers and, more particularly, the invention relates to copolymers containing vinyl alcohol and vinylamine units.

BACKGROUND OF THE INVENTION

Synthesis of amine functional addition polymers in general is difficult for two reasons. The simplest amine functional monomer, vinylamine, is thermodynamically and kinetically unstable relative to the isomeric Schiff base and condensation products of the base, ethylidene imine. Also, more complex molecules containing free radically polymerizable functionality, e.g., olefinic groups, and primary amine functionality are more expensive and typically show severe chain transfer during radical polymerization, especially involving protons on carbon atoms alpha to the nitrogen. The allylamines are particularly good examples of this difficulty and are known to produce mainly low molecular weight polymers and copolymers, even using large amounts of free radical initiators.

Despite these problems, amine containing polymers are highly valued in a number of areas. They represent virtually the only cost effective way of incorporating cationic charge into polymers for, e.g., cationic electrocoating, water treatment and enhanced oil recovery, primary and, to a lesser extent, secondary amines offer the highest general reactivity spectrum of any group compatible with water. They will react with anhydrides, epoxides, isocyanates, esters, aziridines, aldehydes, ketones, Michael acceptors, aminoplasts and other alkylating agents to form covalent linkages. They react with acids and metal ions to form ionic linkages. Simple derivatives, e.g., Schiff bases, strongly and selectively complex many metal ions. This high reactivity produces a myriad of current and potential uses in such areas as coatings, adhesives, binders, structural polymers, viscosity control agents, ion exchange resins, and polymer boundary agents for bio/medical applications.

Because of their high electron donating ability when unprotonated and cationic charge when protonated, they offer superior adhesion to many types of substrates compared to other polymers which are typically neutral or anionic. The ability to change the reactivity and properties of primary or secondary amines by a simple pH change (addition of acid or base) offers numerous valuable options for viscosity control, emulsion stability control, polymer solubility modification (especially in water), or for formulating shelf-stable but reactive crosslinking or substrate reactive systems.

For many purposes it is desirable to prepare water soluble polymers which contain relatively low levels of amine functionality, either to reduce costs by diluting the expensive amine component or for applications in which a lower level of cationic or reactive amine gives superior performance. A particularly attractive polymer for certain applications would be a vinyl alcohol copolymer with a low but controllable level of amine functionality.

Preparation of amine functional polyvinyl alcohol (PVOH) has been previously attempted by hydrolyzing copolymers of vinyl acetate and either N-vinyl-O-t-butyl carbamate or N-vinylacetamide. The carbamate monomer is prepared by a long and costly synthesis and is reported to hydrolyze to a highly toxic aziridine in the presence of water. In both cases the poly(vinyl acetate) component was hydrolyzed with methanolic or aqueous base. In the carbamate case, treatment of an aqueous solution of the poly(vinyl alcohol)-co-poly(N-vinyl-O-t-butyl carbamate) with acid gave the poly(vinyl alcohol)-co-poly(vinylamine) acid salt. Hydrolysis of the poly(N-vinylacetamide) is known to require strong acid at high temperatures. Both approaches produce a relatively dilute aqueous solution of the polymer which is expensive to store or ship or requires expensive additional steps to isolate the polymer from the solution. The aqueous solution also contains substantial amounts of frequently undesirable salts or acid.

R. W. Stackman. et. al., Ind. Eng. Chem. Prod. Res. Dev., 1985, 24, 242 discloses copolymerization of vinyl acetate with N-vinylacetamide and copolymer hydrolysis, probably to the poly(vinyl alcohol)-co-poly(N-vinylacetamide). See R. H. Summerville, et al., polymer Reprints, 24, 12 (1983).

W. M. Brouwer, et al.; J. Polym. Sci. Polym. Chem. Ed., 1984, 22, 353 discloses copolymerization of vinyl acetate with N-vinyl-O-t-butyl carbamate and copolymer hydrolysis.

SUMMARY OF THE INVENTION

The present invention provides, for the first time, an industrially attractive process for synthesizing poly(vinyl alcohol)-co-poly(vinylamine) [PVOH/PVAm] by the unexpected two phase hydrolysis of solvent swollen particles of poly(vinyl alcohol)-co-poly(N-vinyl formamide) [PVOH/PNVF] in methanol. Acid hydrolysis provides a cationic product while previously unknown base hydrolysis yields a salt free amine functional vinyl alcohol copolymer.

Although hydrolysis of amides is difficult and reactions in two-phase polymer/liquid systems with poor accessibility of polymer sites is notoriously difficult, surprisingly, the present process provides for the efficient hydrolysis of vinyl alcohol/N-vinyl formamide copolymer particles in a two phase system yielding PVOH/PVAm particles which can be readily isolated by filtration. Since it is not necessary to dissolve the PVOH/PNVF in order to perform the hydrolysis of the amide functionality of the copolymer, it is not necessary to precipitate the hydrolyzed product again.

As a preferred embodiment the overall process for preparing the PVOH/PVAm would comprise the following steps:

(a) continuously feeding vinyl acetate monomer and N-vinyl formamide monomer into a reaction mixture in a reaction vessel, (b) copolymerizing the vinyl acetate and N-vinyl formamide to yield poly(vinyl acetate)-co-poly(N-vinyl formamide) [PVAc/PNVF] in the reaction mixture, (c) continuously withdrawing from the reaction vessel reaction mixture containing the PVAc/PNVF, (d) hydrolyzing the acetate functionality of the PVAc/PNVF in a methanolic medium to yield a vinyl alcohol copolymer as a gel swollen with methanol and methyl acetate, (e) comminuting the gel to give a particulate copolymer product and optionally rinsing with methanol, (f) hydrolyzing the copolymer particles as a slurry in methanol with acid or base to give PVOH/PVAm particles, and optionally but preferably, (g) washing the particulate PVOH/PVAm with methanol to remove soluble salts and by-products and removing the solvent from the copolymer product, especially by vacuum or thermal stripping.

DETAILED DESCRIPTION OF THE INVENTION

The invention provides a modified polyvinyl alcohol composition comprising a copolymer of vinyl alcohol, optionally vinyl acetate and/or vinyl formamide, and vinylamine of the following general formula I.

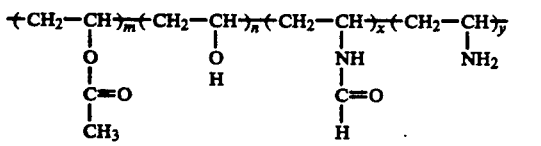

wherein
 m=0-15 mole %,
 n=50-99 mole %,
 x=0-30 mole %, preferably 0.5-10 mole % and
 y=1-50 mole %, preferably 1-25 mole %;
preferably
 m=0-2 mole %,
 n=70-95 mole %.
 x=0.5-10 mole %, and
 y=1-25 mole %.
most preferably
 m=0-2 mole %
 n=85-95 mole %
 x=0.5-4 mole %; and
 y=5-12 mole %

For purposes of describing the invention, the copolymer of formula 1 will be considered poly(vinyl alcohol)-co-poly(vinylamine) and referred to as PVOH/PVAm. Nevertheless, it is to be understood that PVOH/PVAm may contain some vinyl alcohol units as the acetate ester; i.e. vinyl acetate units. Contemplated as the functional equivalent of vinyl acetate for the purposes of this invention are vinyl esters of formic acid and C3-C12 alkanoic acids, benzoic acid and trifluoroacetic acid. In addition, PVOH/PVAm may also contain some vinylamine units as the unhydrolyzed formamide, i.e N-vinyl formamide units. Contemplated as the functional equivalent of N-vinyl formamide for purposes of this invention are vinylamides such as N-vinyl trifluoroacetamide and those in which the nitrogen is substituted with a C1-C4 alkyl or 2-hydroxyalkyl group.

The PVOH/PVAm polymers of the invention have an average molecular weight ($\overline{M}w$) ranging from about 10,000 to 200,000, preferably 15,000 to 130,000.

The copolymers of the invention are prepared by a free radical continuous or batch polymerization process. The continuous process gives more uniform molecular weight distribution and uniformity of comonomer incorporation (i.e. a substantially random homogeneous copolymer), improves the lot-to-lot uniformity and offers the commercial attractiveness of continuous operation. The batch process allows production in simple batch equipment and may be carried to high conversion to avoid monomer stripping.

Suitable free radical initiators for the polymerization reaction would include organic peroxides such as t-butyl peroxypivalate, di(2-ethylhexyl)peroxydicarbonate, t-butyl peroxyneodecanoate and 2,2'-azobisisohexyl)peroxydicarbonate, butyronitrile. The concentration of the initiator in the polymerization reaction mixture will normally range from 0.0001-2 wt %, the preferred concentration being 0.001-0.5 wt %.

Preferably the polymers are prepared using a train of continuous stirred tank reactors followed by a hydrolysis, or alcoholysis, reaction. Vinyl acetate, N-vinyl formamide, free radical initiator and methanol are added continuously to the first reactor. The N-vinyl formamide comonomer can be added to subsequent reactors in order to maintain a homogeneous copolymer.

Unreacted vinyl acetate is removed from the exit stream by contacting it with methanol vapors in a stripping column yielding an intermediate vinyl acetate random copolymer [PVAc/PNVF] having the general formula II.

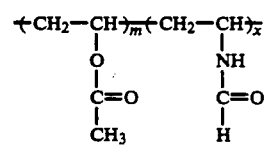

wherein
 m=50-99 mole % and
 x=1-50 mole %.

The alcoholysis of the intermediate PVAc/PNVF copolymer is effected by the addition of a base catalyst. The resulting solid PVOH/PNVF gel swollen by methanol and methyl acetate is ground to give a granular product and rinsed with fresh methanol to remove methyl acetate. The PVOH/PNVF has the following general formula III

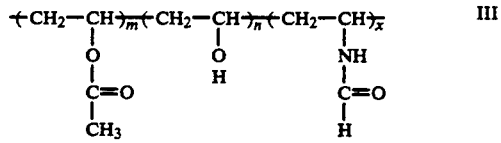

wherein
 m is 0-15 mole %, preferably 0-2 mole % for subsequent base hydrolysis to the vinylamine copolymer.
 n is 50-99 mole %, and
 x is 1 to 50 mole %.

A suitable process for preparing the PVAc/PNVF and subsequent hydrolysis to PVOH/PNVF is essentially like the process described in U.S. Pat. No. 4,675,360 directed to vinyl alcohol/poly(alkyleneoxy) acrylate copolymers, the disclosure which is hereby incorporated by reference.

Stripping of unreacted vinyl acetate is most conveniently done for continuous processes by countercurrent contacting of the polymer paste solution with hot solvent. Stripping may be avoided by fully converting the monomers as in many batch processes. Hydrolysis without prior removal or reduction of vinyl monomer by polymerization or other chemical reaction tends to produce unacceptable levels of acetaldehyde and its condensation products. These in turn produce color and may crosslink PVOH or PVAm groups, reducing polymer solubility. N-vinyl formamide or other vinyl amides are more difficult to remove from the solution polymer, but their higher reactivity than vinyl acetate in the polymerization and frequently lower levels of incorporation minimize the amounts of these monomers present in the final product.

The copolymers of the invention may also contain other comonomers, such as for example, (meth)acrylate, crotonate, fumarate or maleate esters, vinyl chloride, ethylene, N-vinyl pyrrolidone, and styrene in amounts ranging from about 2 to 20 mole %.

The hydrolysis of the PVAc/PNVF may be conducted batch or continuously with acid or base catalysis in various solvents. However it is most conveniently done in methanol, optionally with various levels of water, via base catalyzed transesterification. The reaction gives methyl acetate as a volatile coproduct and PVOH copolymer as a solvent swollen but insoluble separate phase. The level of PVAc hydrolysis is adjusted by varying the base addition level and reaction time, but becomes essentially complete during base initiated PNVF hydrolysis in the subsequent step. Higher levels of base catalyst (e.g., 1 to 3 mole % on PVAc groups in the copolymers with 6 to 12% PNVF) are required for the transesterification reaction than are needed for PVAc homopolymers.

The transesterification solvent (for example methanol) level may be varied over wide ranges which should exceed the amount required by reaction stoichiometry and preferably provide sufficiently low viscosity for efficient mixing of added catalyst and for heat removal. Desirably, a powdery product may be obtained directly in a batch hydrolysis using a vessel with efficient stirring by adding large amounts of methanol, for example a 10-fold excess over PVAc copolymer, but high levels of methanol give lower polymer throughput or require larger equipment. Continuous hydrolysis of copolymer with base can be conveniently practiced at 20-60% polymer solids by mixing the base catalyst with the alcohol solution of the copolymer and extruding the mixture onto a moving belt, much as is done commercially for the preparation of PVOH homopolymer. The hydrolyzed polymer in the form of a methanol/methyl acetate swollen gel is then ground and may be rinsed with fresh methanol to remove catalyst residues and methyl acetate. The resulting methanol swollen polymer can then be dried or, preferably, used as is in the subsequent PNVF hydrolysis step.

The hydrolysis of PVOH/PNVF to PVOH/PVAm can be accomplished by base or acid hydrolysis. Base hydrolysis, preferably with alkali hydroxide (NaOH or KOH) or alkaline earth hydroxide, requires 0.7 to 3 times, preferably 1 to 1.5 times, stoichiometric quantities based on PNVF, and is best conducted at elevated temperatures (50°-80° C.). Although the base or acid hydrolysis reaction can be accomplished in aqueous solution, the product must then be recovered by precipitation or solvent evaporation. As a slurry of methanol swollen PVOH/PNVF particles in methanol, the two phase reaction is initially fast, but slows down after partial conversion, probably reflecting slow reaction with less accessible formamide groups. Conversion after 24 hours is about 85% but can be raised to 93% by adding small amounts of water in amounts of 1 to 20 wt %, based on methanol. The slurry may comprise 10 to 65 wt %, preferably 20 to 50 wt %, copolymer particles in methanol. Contemplated as the functional equivalent of methanol as the liquid medium of the slurry are $C_2$-$C_6$ alkyl alcohols and diols and $C_4$-$C_8$ alkyl ethers.

The methanol may also contain methyl acetate from the hydrolysis of the PVAc component. The two phase hydrolysis has the advantage that the products can be separated from the liquid phase, rinsed, and dried to produce a salt-free primary amine functional PVOH in a commercially practical process.

The base hydrolysis reaction is best run on substantially fully hydrolyzed [>98 mole %] PVOH copolymer. In the following Examples, Runs 5A and B show that attempted hydrolysis of PVAc/PNVF with sufficient base to also hydrolyze the formamide in a single step gave complete acetate transesterification, but no formamide hydrolysis, even when run under pressure at elevated temperatures. This may reflect the reaction of the strong hydroxide or alkoxide base with PVAc to give a weakly nucleophilic acetate salt and water. The latter will transesterify PVAc but not hydrolyze PNVF. Example VI, however, shows that, surprisingly, additional NaOH will successfully hydrolyze PVOH/PNVF powder product as a slurry in methanol containing methyl acetate from the first stage hydrolysis. Use of solvent swollen polymer particles from the prior PVAc hydrolysis is believed to be beneficial in optimizing formamide accessibility to base attack. The addition of water to the hydrolysis mixture is believed to swell the polyvinyl alcohol, which improves the hydrolysis.

Obviously, shorter reaction times or substoichiometric quantities of base can be used to achieve lower levels of formamide hydrolysis as desired.

Acid hydrolysis appears to give rapid and complete PNVF hydrolysis in the copolymer when conducted at temperatures ranging from 15° to 80° C. Suitable strong acids would include the halogen acids, nitric acid, trifluoroacetic acid and methanesulfonic acid, with hydrochloric acid being preferred. Di- and higher valent acids such as sulfuric acid or phosphoric acid may also be suitable. Acid in 0.7 to 3 times, preferably 1 to 1.5 times stoichiometry based on PNVF is required for this hydrolysis reaction with levels near stoichiometric preferred for avoiding post-neutralization of the excess acid. Again, although acid hydrolysis in aqueous solution is feasible, the reaction is preferably performed as a methanol suspension of PVOH/PNVF particles. However, full hydrolysis of the acetate linkages and prior removal of methyl acetate are not required with the two phase acid hydrolysis.

Acid hydrolysis appears to be the preferred route to PVOH/PVAm.HX, i.e. where the charged ammonium salt product is acceptable or preferred.

Thus, N-vinyl formamide is used as an amine precursor which copolymerizes efficiently with structurally similar vinyl acetate under essentially industry-standard conditions and hydrolyzes efficiently under acid or base treatment in a methanol slurry to generate thermally stable reactive primary amines or ammonium salt groups along the polymer chain. Protection of the amine as the readily hydrolyzed formyl derivative in particular allows surprisingly mild conditions in the final step.

The base hydrolysis step proceeds via essentially full hydrolysis of the PVAc component of the copolymer. The coproduced methyl acetate is optionally removed by rinsing the ground, solvent swollen polymer with fresh solvent, and then hydrolysis of the still solvent swollen PVOH/PNVF particles is rapidly effected by alcohol soluble base. The use of a two phase system, i.e. use of a solvent in which the PVOH/PNVF and PVOH/PVAm are no longer soluble, allows the unreacted base and salt products to be removed by decantation and washing, with the copolymer readily recovered in a granular solid form.

Alternatively, acid catalyzed hydrolysis of the ground, solvent swollen polymer depends on protonation of the relatively basic formamide nitrogen to give a good leaving group which can be readily displaced by water or alcohol to give a formate ester or formic acid as products. Unreacted excess acid, salts and by-product formic acid can be removed by decantation or filtration and washing to give a granular solid product.

EXAMPLE 1

The following continuous polymer paste process for making PVAc/PNVF used two 2,000 ml jacketed reaction vessels and a surge vessel with bottom outlets and a methanol stripper column. Each reaction vessel was equipped with a stirrer, feed lines, thermocouple, nitrogen sparge line and reflux condenser. The reaction vessels were connected in series by a gear pump with variable speed motor. The methanol stripper was a 70 cm×75 mm column, containing 8×8 mm Raschig rings in the top two thirds and 6×6 mm Raschig rings in the bottom third. At the top of the column was a take-off condenser and a methanol boiler was connected to the bottom of the column.

Table 1 shows the initial charges that were added to reactors I and II. Continuous feeds 1, 2 and 3 were added to reactor I and feed 4 to reactor II. When the reactor temperatures approached 60° C. the feeds were begun. The flow rates from reactor I to reactor II and from reactor II to the paste collecting port were adjusted to maintain reactor I and reactor II levels. Free monomer (vinyl acetate and N-vinyl formamide) in reactors I and II was monitored periodically by a titration method, percent unreacted N-vinyl formamide was determined by gas chromatography. The amount of catalyst added into reactor I was varied to adjust percent vinyl acetate at steady state.

Once initial equilibrium was achieved, polymer paste was collected. To maximize paste yield at the end of a sequence, reactor I was cooled to ambient and its feeds were discontinued but the feeds (including from reactor I) to reactor II were maintained. When reactor I was empty, the feed to reactor II was discontinued and the contents of reactor II were cooled and commingled with prima material.

Paste was poured or pumped continuously into the surge vessel and pumped to the top of the heated methanol stripper for removal of vinyl acetate. The paste was restripped if necessary to achieve a vinyl acetate level below 0.1%.

Run 1. Synthesis of PVAc/6% PNVF

| Initial Charges (g) | Reactor I | Reactor II |
| --- | --- | --- |
| N-vinylformamide (75% Basis) | 21.3 | 7 |
| Vinyl acetate (distilled) | 460 | 248 |
| Methanol | 1,001 | 1,048 |
| Lupersol 10 | 0.12 | 0.12 |
| Tartaric Acid | 0.02 | 0.02 |
| Feeds | g/h | mL/h |
| 1. Vinyl acetate (dist) | 370 | |
| | | 440 |
| N-Vinylformamide (Dist., 75%) | 21.3 | |
| 2. Methanol | 150 | |
| | | 190 |
| Lupersol 10 | 0.43 | |
| 3. Methanol | 107 | |
| | | 135.5 |
| Tartaric acid | 0.012 | |
| 4. Vinyl acetate (Dist.) | 12 | 12.35 |

Reactor temperatures were 60°–63° C. throughout the polymerization. A higher molecular weight PVAc/6% PNVF paste was collected after initial equilibration when the concentration of vinyl acetate was 30–43% in reactor I and 22–35% in reactor II by titration.

"Prime" PVAc/6% PNVF paste was collected as the free monomer concentration approached 20% in reactor II. Using a catalyst concentration of 0.67% in Feed 2, free monomer was 28 to 30% in reactor I and 16 to 19% in reactor II. Percent unreacted NVF was about 0.76% in reactor I and 0.22% in reactor II. Analysis of the polymer by nmr showed a PNVF:PVAc ratio of 1/16.1, i.e. 6.2% NVF.

Run 2. Synthesis of PVAc/12% PNVF

This run was identical to the previous one except for higher NVF and catalyst ratios:

| Initial Charges (g): | Reactor I | Reactor II |
| --- | --- | --- |
| | Paste from 6% NVF reaction | 500 mL methanol |
| Feeds | g/h | mL/h |
| 1. Vinyl acetate (dist) | 369 | |
| | | 440 |
| N-Vinylformamide (Dist., 75%) | 42.6 | |
| 2. Methanol | 150 | |
| | | 190 |
| Lupersol 10 | 1.0 | |
| 3. Methanol | 107 | |
| | | 135.5 |
| Tartaric acid | 0.012 | |
| 4. Vinyl acetate (Dist.) | 12 | 13.8 |

Reactor temperatures were 60°–63° C. throughout the polymerization. Higher molecular weight PVAc/12% PNVF paste was collected when equilibrium was established and at a catalyst concentration of 1.3% in Feed 2. Free monomer concentration in reactor I was about 33 to 37% and 23 to 29% in reactor II by titration. Percent unreacted NVF was about 2.7% in reactor I and in reactor II.

Prime PVAc/12% PNVF paste was collected as the free monomer concentration approached 22% in reactor II. (Catalyst in Feed 2 at 1.3%). Free monomer was about 29 to 31% in reactor I and 15–22% in reactor II by titration. Unreacted NVF was about 1.45% in reactor I and 0.4% in reactor II. NMR analysis of the polymer product indicated PNVF:PVAc of 1:8.7 or 11.5% NVF.

All paste collected from the stripper was re-stripped until a level of 0.01 to 0.04% residual VAM was achieved.

Run 3. Synthesis of PVAc/1.2% PNVF

This run was similar to the previous runs except for lower NVF and catalyst ratios.

| Initial Charges (g) | Reactor I | Reactor II |
|---|---|---|
| N-vinyl formamide (75% basis) | 6.24 | 2.15 |
| Vinyl acetate (distilled) | 461.8 | 248 |
| Methanol | 1001 | 1084 |
| Lupersol 10 | 0.18 | 0.18 |
| Tartaric Acid | 0.02 | 0.02 |
| Feeds | g/h | mL/h |
| 1. Vinyl acetate (dist) | 400 | 435 |
|    NVF (dist., 75% purity) | 6.24 | |
| 2. Methanol | 150 | 189.6 |
|    Lupersol 10 | 0.63 | |
| 3. Methanol | 107 | 135.6 |
|    Tartaric acid | 0.012 | |
| 4. Vinyl acetate | 10 | 13.2 |
|    NVF | 2.15 | |

At steady state the free monomer was 23.6–30.9% in reactor I and 16.3–30.9% in reactor II. Solids were about 28%. Residual unreacted NVF was 0.19%. NMR indicated a PNVF content of 1.2%.

EXAMPLE II

This example demonstrates the hydrolysis of PVAc/PNVF to PVOH/PNVF and the subsequent hydrolysis to PVOH/PVAm.

In general, PVAc/PNVF paste was added to a flexible plastic bag. KOH (0.01 eq. on VAc) dissolved in methanol was added to the bag with thorough mixing. The bag was sealed and heated at 60° C. in a water bath for 15 minutes, precipitating the polymer as a white rubbery slab.

The PVOH/PNVF "slab" was mechanically ground into small pieces, the ground polymer was added to a round-bottom flask equipped with mechanical stirrer, temperature controlled heating mantle, nitrogen blanket, thermometer, and condenser. Methanol was added to the flask to give about 15% polymer slurry by weight. (An attempt to hydrolyze PVOH/PNVF in methanol containing 10% deionized water resulted in slightly higher percent hydrolysis.) KOH (1.2 eq. on NVF) dissolved in methanol was added to the slurry. The slurry was stirred vigorously and heated to reflux (63° C.) for 12 hours after which the slurry was cooled to ambient, filtered, washed with methanol and dried at 60° C. under house vacuum.

Run 4A. Hydrolysis of PVAc/6% PNVF to PVOH/6% PNVF. KOH (0.0045 g; 0.0001 mol; 0.04 mol % on VAc) was dissolved in 5 mL of methanol and added to PVAc/6% PNVF prime paste (50 g paste; 18.5 g of solid; 0.23 mol) with thorough mixing. The solution was poured into a plastic bag. The bag was sealed and heated at 50° C. in a water bath for 2.0 h with no change in appearance. KOH (0.11 g; 0.002 mol; 1.0 mol % on VAc) was dissolved in 5 mL of methanol and added to the bag with thorough mixing. The bag was re-sealed and placed in the water bath at 50° C., immediately precipitating the polymer as a white rubbery slab. After 15 min., heating was discontinued and the slab was removed from the bag, mechanically ground, washed with methanol, decanted, then stored under fresh MeOH. Molecular weight measurements gave $\overline{M}n=23,000$, $\overline{M}w=44,000$ for PVOH/6% PNVF.

Run 4B. Slurry Hydrolysis of PVOH/6% PNVF to PVOH/6% PVAm. To a 100 mL round-bottom flask equipped with mechanical stirrer, heating mantle, N₂ blanket, thermometer and thermowatch were added the PVOH/PNVF polymer (Run 4A) and 75 mL of methanol. KOH (1.05 g; 0.0187 mol; 1.36 eq. on original NVF) was dissolved in 5 mL of methanol and added to the slurry. The slurry was heated with vigorous stirring at reflux (63° C.) for 3.25 h. Base consumption was monitored by potentiometric titration of 5 mL aliquots (MeOH-based solution) with approximately 0.1M HCl to pH=7. After heating for 3.25 h, the slurry volume was low due to evaporation of methanol and removal of aliquots for titration. Heating was discontinued and the slurry was cooled overnight.

The following day, 50 mL of methanol was added. The slurry was reheated with vigorous stirring at reflux for 5 h. Base consumption was monitored as above. The slurry was then cooled, filtered, washed with methanol and dried at 60° C. under house vacuum to give 6.6 g of oven dried material. This product showed complete PVAc hydrolysis and 77% PNVF hydrolysis.

Run 5. Attempted One-Step Hydrolysis of PVAc/6% PNVF to PVOH/6% PVAm in Methanol A. NaOH (0.25 g; 0.0063 mol; 0.077 eq. on VAc; 1.2 eq. on NVF) was dissolved in 5 mL of methanol and added to PVAc/6% PNVF in MeOH solution (7.4 g of polymer; 0.087 mol) with stirring, giving a viscous solution. The solution was poured into a 40 mL parr reactor. The solution precipitated giving a white slurry. The Parr reactor was sealed and heated 3 h at 80° C. (pressure ~20 psi). The solid white polymer was removed from the reactor, mechanically ground into small pieces and washed with methanol. The polymer was dried on a rotary vacuum evaporator, giving 3.9 g of dry polymer (0.0888 mol; 102% yield) and analyzed by NMR in DMSO-d6: essentially no polymer bound acetate or acetamide, 5% PNVF remaining.

B. KOH (0.35 g, 0.0062 mol; 0.076 eq. on VAc, 1.2 eq. on NVF) was dissolved in 5 mL of methanol and added to PVAc/6% PNVF MeOH solution polymer (7.4 g polymer; 0.087 mol) and treated as above. Dry polymer, 4.0 g, was obtained (0.091 mol; 1.05% yield), NMR (DMSO-d6): PVOH/5.4% PNVF.

Run 6A. Hydrolysis of PVAc/12% PNVF to PVOH/12% PNVF

PVAc/12% PNVF (3396 g of paste at 40.3% solids and 374.6 g of paste at 41.0% solids; 18.07 mol) was added to 6 plastic bags in approximately equal amounts. KOH (0.01 eq on VAc; 10.1 g) dissolved in methanol was added to each bag with thorough mixing. The bags were sealed and heated at 60° C. in a water bath for 15 min, precipitating the polymer as a white, rubbery slab. The slabs were stored overnight under methanol, then mechanically ground, washed with methanol, then stored overnight under fresh methanol. Molecular weight measurements gave $\overline{M}n=21,000$, $\overline{M}w=45,000$ for PVOH/12% PNVF.

Run 6B. Slurry Hydrolysis of PVOH/12% PNVF to PVOH/12% PVAm

The polymer slurry from Run 7A was filtered to remove the excess methanol. The ground polymer slabs and 5550 g of fresh methanol were then added to a 12 L round-bottom flask equipped with mechanical stirrer, heating mantle, N₂ blanket, thermometer, thermowatch and solution withdraw tube. KOH (2.6 mol; 146.0 g; 1.2 eq on original NVF) was dissolved in 209.6 g of methanol and added to the slurry. The slurry was stirred vigorously and heated at reflux (63° C.) for 12 h. Base consumption was monitored by potentiometric titration of 5 mL aliquots of the reaction solution with 0.12M HCl to pH=7.

| Percent Hydrolysis of NVF by Potentiometric Titration | |
|---|---|
| Hours at Reflux | % Hydrolysis of NVF |
| 0 (ambient) | 26.3 |
| 0 (just at reflux) | 39.7 |
| 1.5 | 64.3 |
| 3.0 | 72.1 |
| 3.0 | 72.1 |
| 4.5 | 76.5 |
| 12.0 | 84.3 |

*5 mL aliquots titrated with 0.1 N HCl.

The slurry was then cooled, filtered, washed with methanol and dried at 60° C. under house vacuum to give 866.2 g of oven dried material. This product showed complete PVAc hydrolysis and 80% PNVF hydrolysis by NMR.

EXAMPLE III

The following is an example for the preparation of PVOH/PVAm from PVAc/PVNF with intermediate drying of PVOH/PNVF:

To a 250 mL 3-neck round-bottom flask equipped with mechanical stirrer, $N_2$ purge, thermometer, thermowatch and heating mantle, were added PVAc/1.2% PNVF (90.0 g at 16.7% solids, 0.19 mol). The paste was heated with vigorous agitation to 60° C. under $N_6$. At 60° C. NaOH was added (as a 50% soln) and the sample was stirred for 15 min. The white polymer slurry was concentrated to a dry powder on a rotary evaporator, reslurried in methanol and again concentrated to a dry powder. The polymer was checked by GLPC for the absence of methyl acetate, reslurried in methanol (100 mL) in a 250 mL 3-neck round-bottom flask equipped as previously described. To the slurry was added NaOH (1.04 g of 50% solution, 0.0130 mol) and the slurry was heated at reflux (65° C.) for 4 h. The polymer was collected by filtration, washed with ~100 mL of methanol, and dried at 60° C. under house vacuum. Average yield was 86%. The product showed complete PVAc hydrolysis and 96% PNVF hydrolysis by NMR.

EXAMPLE IV

This example illustrates the hydrolysis of PVOH/PNVF to PVOH/PVAm under one-phase conditions.

KOH (0.79 g; 0.0141 mol; 1.0 mol % on VAc) was dissolved in 10 mL of methanol and added to PVAc/12% PNVF (327 g paste; 135.1 g of solids; 3.21 mol) with thorough mixing in two plastic bags. The bags were sealed and heated at 60° C. in a water bath for 15 min, giving a white polymer slab. The slab was removed from the bag, cut into small pieces, washed with methanol and dried at 60° C. under house vacuum; 156 g of oven dried material was obtained. Molecular weight measurements gave $\bar{M}n=21,000$, $\bar{M}w=45,000$ for PVOH/12% PNVF.

To a 2 L round-bottom flask equipped with a heating mantle, mechanical stirrer, condenser, $N_2$ blanket, thermometer and thermowatch were added PVOH/PNVF from above (104 g dried material; 2.96 mol) and water (1260g). KOH (21.9 g; 0.390 mol; 1.1 eq. on NVF) was dissolved in 20 ml of water and added to the polymer mixture. The mixture was heated at 80° C. with vigorous stirring for 3.0 h, giving a viscous solution. PVOH/12% PVAm was isolated by precipitating out of MeOH. Yield: 113 g oven dried material obtained.

This product showed complete PVAc hydrolysis and 93% PNVF hydrolysis by NMR.

EXAMPLE V

This example illustrates the slurry, acid hydrolysis of PVOH/PNVF to PVOH/PVAm.

Run 7A. Slab Hydrolysis of PVAc/12% PNVF

KOH (0.0064 mol; 0.36 g; 0.01 eq. on VAc) was dissolved in 20 ml of methanol and added to 150 g of PVAc/12% PNVF prime paste (0.73 mol; 61.5 g) with thorough mixing in a plastic bag. The bag was sealed and heated at 60° C. in a water bath for 15 min; precipitating the polymer as a white rubber slab. The slab was removed from the bag, mechanically ground into small pieces on a grinder, washed with methanol, then stored overnight under fresh methanol.

Run 7B. Slurry, Acid Hydrolysis of PVOH/12% PNVF

The above polymer slurry was filtered to remove the excess methanol. The ground polymer and 250 g of fresh methanol were then added to a 1 L round bottom flask equipped with mechanical stirrer, heating mantle, nitrogen blanket, thermometer, thermowatch and condenser with distillation trap. HCl (0.105 mol; 3.83 g; 1.2 eq. on NVF) was added to the slurry. The slurry was stirred vigorously and heated reflux for 12 h. Acid consumption was monitored by potentiometric titration of 3 mL aliquots of the reaction solution with 0.1 % NaOH to pH 7. The slurry was cooled to ambient, and washed with methanol and dried at 60° C. under house vacuum to give 31.4 g of polymer. NMR analysis indicated complete hydrolysis.

| Hydrolysis of PVOH/PNVF in Methanol/HCl | |
|---|---|
| Hours at 68° C. | NaOH (ml) |
| Ambient | 6.0 |
| 0 | 4.2 |
| 1 | 3.0 |
| 3 | 1.7 |
| 6 | 1.4 |
| 12 | 1.3 |

EXAMPLE VI

This example illustrates an essentially one step process for batch preparation of PVOH/PVAm under basic conditions as a powder product without a grinding step and without removal of methyl acetate.

To a 250 ml 3-necked round bottom flask equipped with condenser, mechanical stirrer and catalyst feed tube were added 60 g of methanol and 100 g of PVAc/6% PNVF paste (15.88% solid). The resulting solution was heated to 65° C., and KOH (0.1986 g; 0.02 eq. on VAc) in 10 g of methanol was then added into the polymer solution over 1 h. The polymer precipitated as a white polymer powder near the end of catalyst addition. After stirring the polymer slurry for ¼ h at 65° C., KOH (0.942 g; 1.5 eq. on NVF) in a 20 g of methanol was added in. The resulting slurry was stirred vigorously and heated at 65° C. for 12 hr. The slurry was cooled to ambient, and filtered, washed with methanol and dried at 60° C. under house vacuum to give 8.2 g of polymer. NMR analysis indicated complete hydrolysis of PVAc and 82% hydrolysis of PNVF.

EXAMPLE VII

This example illustrates the improvement in the speed and efficiency of the PVOH/PNVF hydrolysis in methanol containing water.

Preparation of PVOH/12% PNVF. PVAc/12% PNVF (600 g of paste at 46.5% solids = 279 g; 3.32 mol) was added to 2 plastic bags in equal amounts. KOH (0.01 eq on VAc; 1.64 g) dissolved in methanol was added to each bag with thorough mixing. The bags were sealed and heated at 60° C. in a water bath for 15 min., precipitating the polymer as white rubbery slabs. The slabs were softer than usual and imparted a pale yellow color to the methanol wash. $^1$H MNR analysis of a dry sample indicated 6.9 mol % of the polymer was unhydrolyzed vinyl acetate.

The slabs were mechanically ground into small pieces and divided into three approximately equal parts. Each part was washed and soaked overnight in a methanol solution containing 1% water (A), 5% water (B), or 10% water (C).

Preparation of PVOH/12% PVAm. The polymer slurries were separately filtered to remove the excess methanol/water solution. The wet polymer samples were added to separate 1 L round-bottom flasks each equipped with a mechanical stirrer, heating mantle. $N_2$ blanket, thermometer, thermowatch and condenser. Solvent was added to each flask as shown on the table:

| | % Water In Methanol | Approx. Volume | G Dry Polymer | % Yield |
|---|---|---|---|---|
| A | 1 | 566 ML | 38.9 | 81.2 |
| B | 5 | 566 ML | 37.2 | 77.7 |
| C | 10 | 590 ML | 38.2 | 79.8 |

KOH (1.2 eq on original NVF; 0.160 mol 8.97 g) dissolved in methanol was added to each slurry. The slurries were stirred vigorously and heated to reflux (63° C.) for 12 h. Base consumption was monitored by potentiometric titration of 3 mL aliquots of the reaction solution with 0.12M HCl to pH=7. After 12 h. at reflux, each slurry was cooled to ambient, filtered, washed with methanol and dried at 60° C. under house vacuum.

The results show that hydrolysis rate and extent increased with increasing water addition to the methanol.

| | | Calculated % Hydrolysis of NVF By Titration | | | | | |
|---|---|---|---|---|---|---|---|
| % Water | | | Just at | Hrs. At Reflux | | | |
| In Solvent | | Ambient | Reflux | 1 | 3 | 6 | 12 |
| 1 | (A) | 38.4 | 40 | 70.7 | 82.7 | 89.5 | 92.5 |
| 5 | (B) | 36.7 | 36.7 | 75.8 | 82.6 | 89.5 | 96.3 |
| 10 | (C) | 26.1 | 38.5 | 77.5 | 86.4 | 91.7 | 98.8 |

B and C showed 93% hydrolysis by $^1$H MNR analysis. The lack of agreement with the titration results may reflect partial reaction of KOH with residual acetate groups in this polymer.

STATEMENT OF INDUSTRIAL APPLICATION

The two phase hydrolysis of poly(vinyl alcohol)-co-poly(vinylamide) yields poly(vinyl alcohol)/poly(vinylamine) which can be used in the preparation of a paperboard product by depositing wood pulp from an aqueous slurry containing an effective amount of a moist compressive strength additive mixture consisting essentially of the poly(vinyl alcohol)/poly(vinylamine) and, optionally, an anionic polymer such as carboxymethyl cellulose.

We claim:

1. A method for making a poly(vinyl alcohol)-co-poly(vinylamine) which comprises
   (a) continuously feeding vinyl acetate monomer and N-vinyl formamide monomer into a reaction mixture in a reaction vessel,
   (b) copolymerizing the vinyl acetate and N-vinyl formamide monomers to yield poly(vinyl acetate)-co-poly(N-vinyl formamide) in the reaction mixture,
   (c) continuously withdrawing from the reaction vessel reaction mixture containing the poly(vinyl acetate)-co-poly(N-vinyl formamide),
   (d) hydrolyzing the acetate functionality of the poly(vinyl acetate)-co-poly(N-vinyl formamide) in a methanolic medium to yield poly(vinyl alcohol)-co-poly(N-vinyl formamide) as a gel swollen with methanol and methyl acetate,
   (e) comminuting the gel to a particulate copolymer product, and
   (f) hydrolyzing the copolymer particles as a slurry in methanol under acid or base conditions to yield poly(vinyl alcohol)-co-poly(vinylamine) particles.

2. The method of claim 1 in which the hydrolysis of step (f) is performed using base to yield salt free particles of the vinylamine copolymer.

3. The method of claim 1 in which the hydrolysis of step (f) is performed using acid to yield particles of the corresponding acid salt of the vinylamine copolymer.

4. The method of claim 1 in which the poly(vinyl alcohol)-co-poly(vinylamide) is represented by the following formula

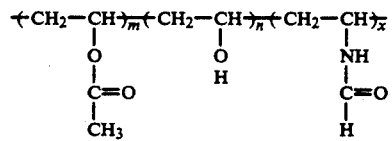

wherein
m is 0 to 15 mole %,
n is 50 to 99 mole %, and
x is 1 to 50 mole %.

5. The method of claim 4 in which the hydrolysis yields a copolymer of the following formula

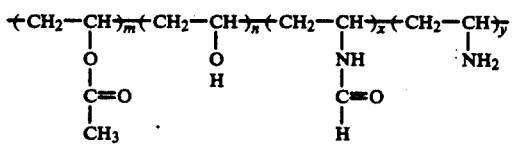

wherein
m is 0–15 mole %,
n is 50–99 mole %
x is 0–30 mole %, and
y is 1–50 mole %.

6. The method of claim 3 in which the poly(vinyl alcohol-co-poly(vinylamide) is represented by the following formula

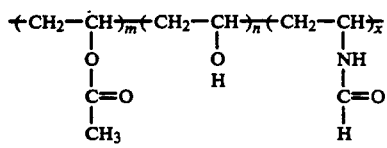

wherein m is 0 to 15 mole %, n is 50 to 99 mole %, and x is 1 to 50 mole %.

7. The method of claim 6 in which the hydrolysis yields the corresponding acid salt of a copolymer of the following formula

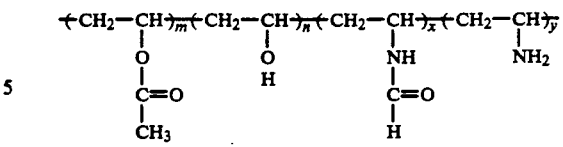

wherein
m is 0–15 mole %,
n is 50–99 mole %
x is 0–30 mole %, and
y is 1–50 mole %.

8. The method of claim 1 including
(g) washing the poly(vinyl alcohol)-co-poly(vinylamine) with methanol and removing the methanol from the copolymer.

9. The method of claim 1 in which the particulate copolymer product of step (e) is rinsed with methanol prior to the hydrolyzing of step (f).

* * * * *